(12) United States Patent
Butani et al.

(10) Patent No.: US 12,544,027 B2
(45) Date of Patent: Feb. 10, 2026

(54) SYSTEM AND METHOD AR GUIDED BREAST EXCISION SURGERIES UTILIZING CABINET X-RAY SYSTEMS

(71) Applicant: KUB TECHNOLOGIES, INC., Stratford, CT (US)

(72) Inventors: Vikram Butani, Fairfield, CT (US); Chester Lowe, Palm Springs, CA (US)

(73) Assignee: KUB TECHNOLOGIES, INC., Stratford, CT (US)

( * ) Notice: Subject to any disclaimer, the term of this patent is extended or adjusted under 35 U.S.C. 154(b) by 166 days.

(21) Appl. No.: 18/534,586

(22) Filed: Dec. 9, 2023

(65) Prior Publication Data

US 2025/0186010 A1    Jun. 12, 2025

(51) Int. Cl.
*A61B 6/00* (2024.01)
*A61B 6/10* (2006.01)
*A61B 6/46* (2024.01)
*A61B 6/50* (2024.01)
*A61B 90/00* (2016.01)

(52) U.S. Cl.
CPC .............. *A61B 6/502* (2013.01); *A61B 6/107* (2013.01); *A61B 6/461* (2013.01); *A61B 6/467* (2013.01); *A61B 90/36* (2016.02); *A61B 2090/365* (2016.02); *A61B 2090/372* (2016.02)

(58) Field of Classification Search
CPC ......... A61B 6/107; A61B 6/461; A61B 6/467; A61B 6/502; A61B 90/36; A61B 2090/365; A61B 2090/372
See application file for complete search history.

(56) References Cited

U.S. PATENT DOCUMENTS

| | | | |
|---|---|---|---|
| 2018/0228010 A1* | 8/2018 | Butani | .................. A61B 6/107 |
| 2019/0034849 A1 | 1/2019 | Romaine et al. | |
| 2019/0251961 A1 | 8/2019 | Wang et al. | |
| 2021/0223864 A1* | 7/2021 | Forsland | ................ G06F 1/163 |

OTHER PUBLICATIONS

United States Patent and Trademark Office, International Search Report, Application No. PCT/US2024/059204, mailed Feb. 24, 2025, 2 pages.
United States Patent and Trademark Office, Written Opinion of the Search Authority, Application No. PCT/UST2024/059204, mailed Feb. 24, 2025, 8 pages.

* cited by examiner

*Primary Examiner* — Mark R Gaworecki
(74) *Attorney, Agent, or Firm* — Ziegler IP Law Group, LLC

(57) ABSTRACT

A cabinet x-ray incorporating voice and video (AR) command operation for the production of organic and non-organic images. The computing device receives audio and video data and then determines, based on the audio and video data, an initiated action. In particular, the aspects of the disclosed embodiments relate to a system and method with corresponding apparatus for commanding the cabinet x-ray unit to attain and optimize images.

8 Claims, 4 Drawing Sheets

Workflow of AR Unit and Display

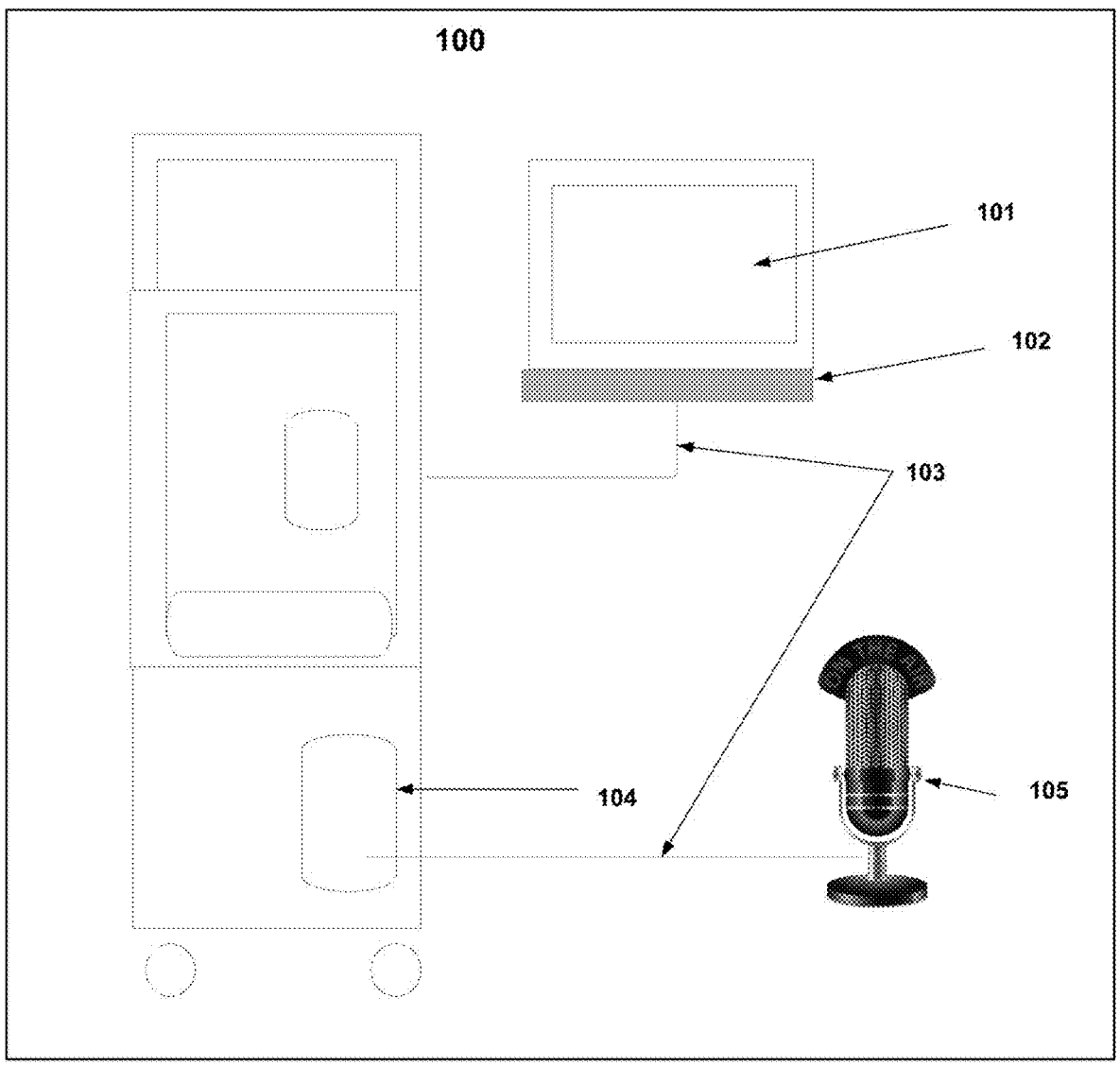
Fig. 1 – Example of Embodiment

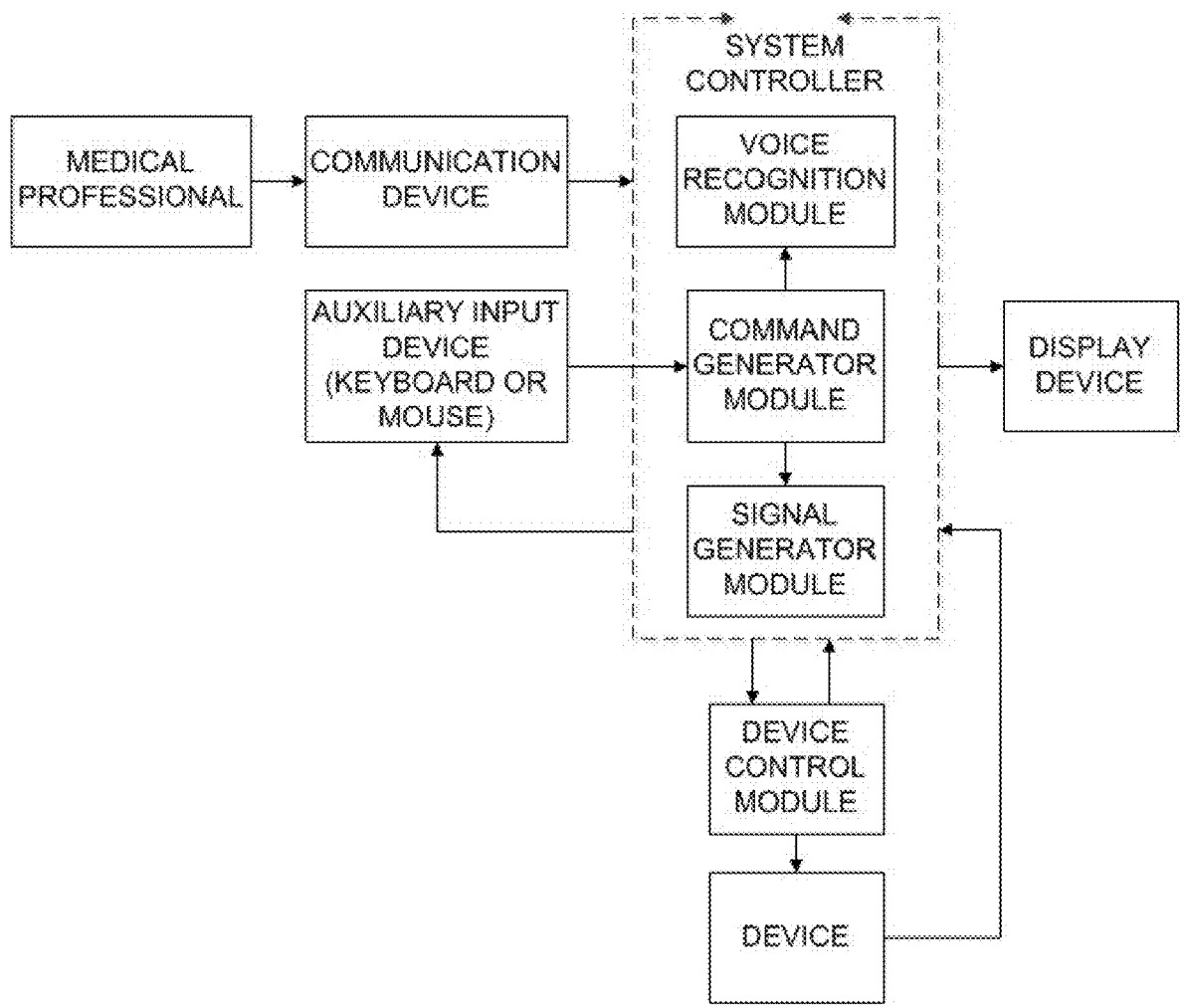
Fig. 2 – Basic Workflow

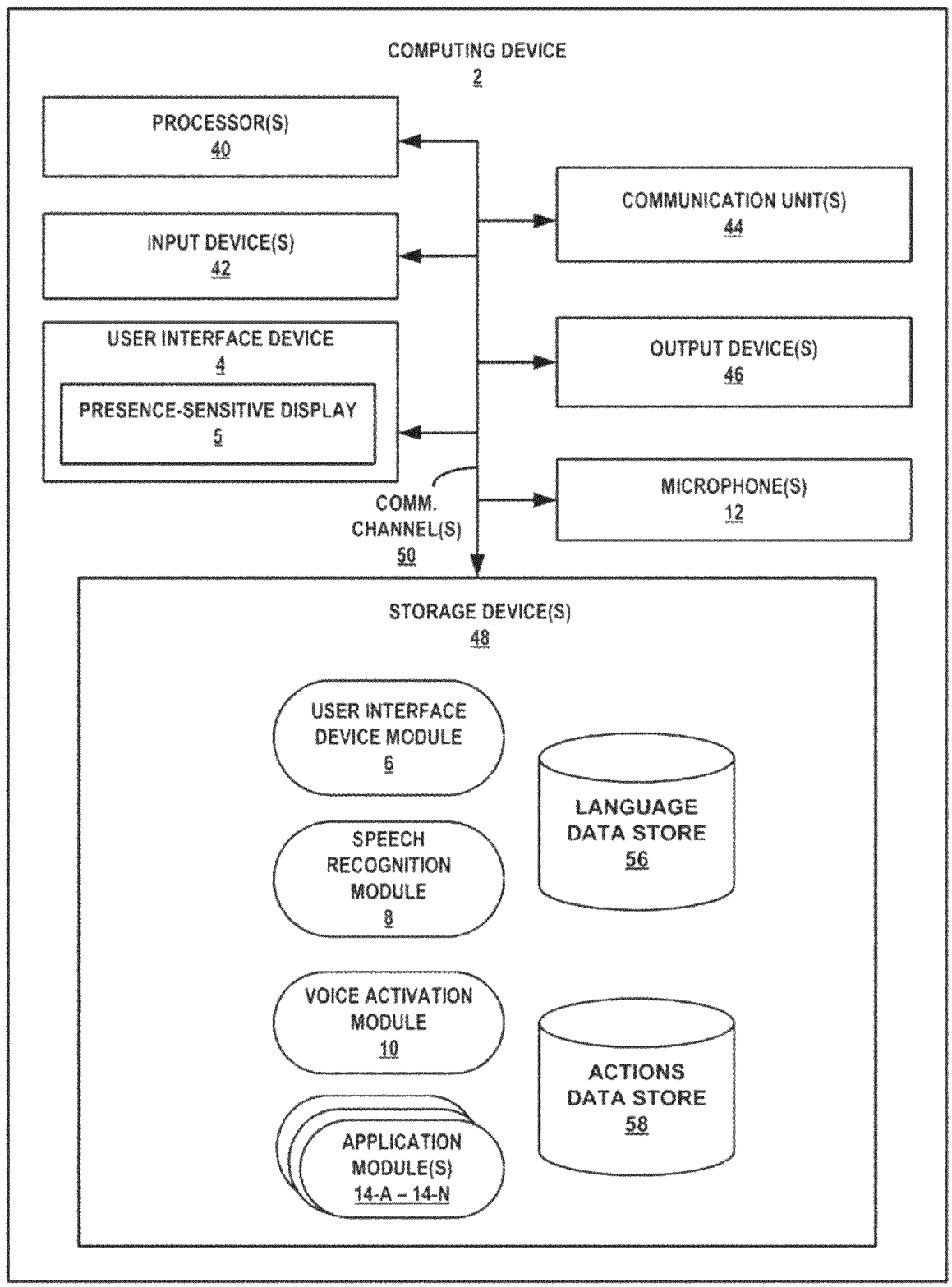
Fig. 3 – Computing Device

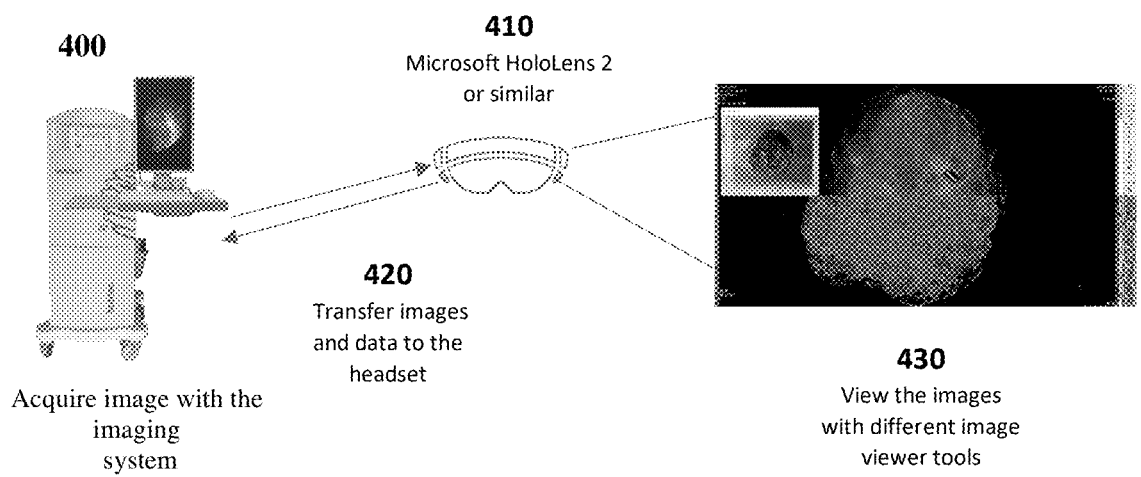
Fig. 4 – Workflow of AR Unit and Display

SYSTEM AND METHOD AR GUIDED BREAST EXCISION SURGERIES UTILIZING CABINET X-RAY SYSTEMS

CROSS-REFERENCE TO RELATED APPLICATIONS

This application is related to the following applications filed on 9 Dec. 2023, the disclosures of which are each, individually, incorporated herein by reference in their entireties: U.S. Ser. Nos. 18/534,584; 18/534,587; 18/534,588; 18/534,589; 18/534,590; 18/534,591 and 18/534,592.

BACKGROUND

Field of the Present Disclosure

The aspects of the disclosed embodiments relate to the field of a cabinet x-ray incorporating a system and method of Augmented Reality (AR) Guided Breast Excision Surgeries utilizing cabinet x-ray systems.

Background

Breast cancer is the most common cancer among women other than skin cancer, and is the second leading cause of cancer death in women after lung cancer. The American Cancer Society currently estimates that there are about 182,460 new cases of invasive breast cancer per year among women in the United States and 40,480 deaths per year from the disease. Prevention and early diagnosis of breast cancer are of foremost importance. Because early breast cancer does not produce symptoms, the American Cancer Society recommends an x-ray radiogram screening and a clinical breast examination every year for women over the age of 40. Recently, the American Cancer Society has additionally recommended an adjunctive breast MRI (magnetic resonance imaging) screening for women in certain higher-risk groups. Although the preferred embodiments described herein below are particularly applicable and advantageous for use in x-ray mammography and x-ray tomosynthesis breast cancer screening environments, they are also readily applicable for other breast imaging modalities such as breast specimen radiography and digital breast specimen tomosynthesis.

Lumps or abnormalities in the breast are often detected by physical examination, mammography, ultrasound, or other imaging studies. However, it is not always possible to tell from these imaging tests whether a growth is benign or cancerous.

Specimen Radiography is considered the most cost-effective screening method for the detection of breast cancer in surgically removed breast tissue. However, the sensitivity of specimen radiography is often limited by the presence of overlapping dense fibroglandular tissue in the breast specimen. Dense parenchyma reduces the conspicuity of abnormalities and thus constitutes one of the main causes of missed breast cancer diagnosis. The advent of full-field digital detectors offers opportunities to develop advanced techniques for improved imaging of dense breasts, such as digital tomosynthesis.

Augmented Reality (AR) technology is revolutionizing the health care market nowadays, this document presents a project idea to cope up with the recent advancement and growth of AR and its role in medical imaging field. AR guided surgeries have got a big attention recently, and it will be the future of healthcare.

The issue that surgeons may face during breast tumor excision, is that they might need to excise more tissue if the margins are not clean. Surgeons decide that based on the images acquired by cabinet imaging products. The user will need to determine which part of the tissue needs to be excised more manually and based on the image. The current status quo is that images is acquired by the cabinet radiography system and displayed on a computer monitor. Users need to look at the monitor and different views of the image until they find the right amount of tissue to remove/excise. A state of the art solution for the surgeon is to use Augmented Reality to view the images as holographic visualization on a headset and project them on the patient's body for better placement which will make it easier for the surgeon to visualize if more tissue must be excised. With a headset the user can view the images and perform all kind of image processing that the current Display utilizing Image Viewer software offers, like zoom in, zoom out, and writing annotations.

It would be advantageous in breast procedure rooms to allow the medical professional to operate the cabinet x-ray unit to analyze the excised breast tissue or specimen utilizing augmented reality. For example, certain medical instruments require the medical professional to use both hands and to stand next to the patient, sometimes in an awkward position throughout the entire procedure making it difficult for the medical professional to operate other equipment. At other times it is difficult for a pathology assistant to operate equipment while dissecting tissue specimens with both hands.

Currently it is believed that there is not a system or method utilizing augmented reality combined with a cabinet x-ray system.

Today, conventional breast specimen systems can gather a digital breast specimen radiogram separately. In these systems, the radiograms of a tissue or bone specimen are viewed separately for analysis.

History of AR in Healthcare

AR has emerged as one of the most advanced technologies that are expected to grow quickly and change the future of health care industry. There are many examples for AR in healthcare especially AR guided surgeries. Here are two examples.

One example is the MediView® XR30 system, which provides an ultrasound imaging solution with the ability to view the image in an ergonomically optimized location during a procedure through augmented reality. This solution reduces the confusion that results from looking at the monitor and the patient body during the surgery.

Another example is the Surgical Theater SyncAR® technology that is presented by Medtronic in partnership with Surgical Theater Inc. This product help planning and practicing complex surgeries. It enables the surgeons to see the location of the instruments in relation to the body parts during a surgery without losing the focus on the patient.

SUMMARY

The aspects of the disclosed embodiments relate to the field of a cabinet x-ray incorporating voice command and AR video operation for the production of organic and non-organic images. The computing device receives audio and video data and determines, based on the audio and video data, a voice and/or AR initiated action. In particular, the invention relates to a system and method with corresponding apparatus for commanding the cabinet x-ray unit via audio or AR video commands to attain and optimize images.

In general, this disclosure may enable a device (cabinet x-ray system) utilizing a computer to display the extracted breast specimen on a AR headset, such as the Microsoft® HoloLens 2 virtual reality equipment but it is not limited to just this headset. With a unit incorporating augmented reality, the clinician can utilize the augmented reality to expeditiously visualize the specimen excised from the patient without manual intervention with their gloved hands saving time for both the patient on the treatment table and the clinician.

The device receiving a voice command via a microphone, for example, and utilizing speech-recognition techniques/software to analyze the audio data may determine one or more augmented reality for causing the device to perform voice-initiated actions allowing the medical professional to operate the cabinet x-ray equipment utilizing augmented reality would free up personnel in the operating room as well as allow the medical professional to remain sterile and remain close to the patient.

The above explains how the aspects of the disclosed embodiments would relate to specimen radiography but the aspects of the disclosed embodiments are not isolated to specimen radiography but may be utilized for non-destructive testing, pathology as well as any radiographic analysis, organic and non-organic, requiring a cabinet x-ray system.

A preferred embodiment of the system would incorporate voice command into a cabinet x-ray unit allowing operation of the system freeing up the operator's hand/s.

BRIEF DESCRIPTION OF THE DRAWINGS

To further clarify the above and other advantages and features of the aspects of the disclosed embodiments, a more particular description of the aspects of the disclosed embodiments will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 is one example embodiment of the present disclosure;

FIG. 2 is a display of the basic workflow of the one example embodiment of the present disclosure;

FIG. 3 is an example of the computing device utilized in the example embodiment of the present disclosure;

FIG. 4 is an example of how data is displayed and exchanged between the AR headset.

DETAILED DESCRIPTION OF EMBODIMENT

Reference will now be made to figures wherein like structures will be provided with like reference designations. It is understood that the drawings are diagrammatic and schematic representations of exemplary embodiments of the invention, and are not limiting of the present invention nor are they necessarily drawn to scale. FIGS. 1-3 depict various features of embodiments of the present invention, which embodiments are generally directed to a system that can utilize voice-initiated commands to perform functions. Referring first to FIG. 1, there is shown an example of the embodiment of a voice-initiated cabinet x-ray unit 100. Medical professional or other authorized operator speaks into the microphone 105 which sends data via a cable 103 to computer 104. This, in turn, provides more flexibility for a clinician or other user of the system and simplifies the procedure. Manual input for operation of the cabinet x-ray unit 100 may be initiated via keyboard 102 and the resulting image from both the manual-initiated or voice-initiated examination is displayed on the screen 101 and configured in accordance with one example embodiment of the present invention. FIG. 2 displays the basic workflow of the cabinet x-ray unit FIGS. 1-100. FIG. 3 gives a basic workflow and components of the computing device 2. Manual Input items 42, 4, 5 are represented in FIGS. 1-102 and the voice-initiated microphone 12 is previously represented in FIG. 1-105. Processor 40 will access the storage device 48 to verify voice-initiated key word utilizing the speech recognition module 8 and the voice activation module 10 wherein reference will be made to both language data store 56 and actions data store 58 before actuating the application module 14-A-14-N. Note that, for clarity, only selected features of the base unit 100, basic computer 104, and the workflow of the computing device FIG. 3-2 are described herein in detail. Indeed, it is appreciated that the system 100 and its individual components can include additional features and components, though not disclosed herein, while still preserving the principles of the present invention. Note also that the base computer 104 can be one of any number devices, including a desktop or laptop computer, etc.

FIG. 4 400 is the example of the main system. Data is transmitted and input 420 between 400 and the headset 410 and what is displayed is shown in 430.

Design Features

The input to this project or the given facts are:

Images acquired by Cabinet imaging products, is required to be transferred to the headset.

Markers to project the image in the right location on the patient body.

The ability to use a head set to view the images as a holographic visualization.

The ability to view the different image views, K-view, 3D slices, optical and blended image, and the ability to edit the images and add annotations as required.

Two modes for viewing the images, first one is to project the images in the right location on the patient body, and the second one is to view it in a free mode anywhere in the space, where user can use different image viewer features and tools.

View the image viewer tools in addition to the image and hide them when not needed.

The ability to view the instruments along with the image for better visualization.

The Microsoft® HoloLens 2 virtual reality equipment, as an example, has been a pioneer in cooperating with healthcare industry to implement a mixed reality solutions and products. The Microsoft® HoloLens 2 virtual reality equipment is a headset that allows a bidirectional communication with other devices (like the imaging system as embodied herein).

The Microsoft® HoloLens 2 virtual reality equipment provides different features as it provides head tracking, eye tracking, hand tracking, voice recognition, and 3D display.

The present invention may be embodied in other specific forms without departing from its spirit or essential characteristics. The described embodiments are to be considered in all respects only as illustrative, not restrictive. All changes that come within the meaning and range of equivalency of the claims are to be embraced within their scope.

What is claimed is:

1. A cabinet x-ray system incorporating a voice command module, comprising:
   a cabinet x-ray system;
   a base unit including an image processor and a display;
   a computing device located in the base unit controlling the cabinet x-ray system;
   a microphone connected to the base unit,
   the base unit including:
      a speech-recognition module;
      a system configured to receive analog signals relating to augmented reality;
      a means to verify that a speech command is recognized;
      a key word glossary;
      a processing unit that controls the speech recognition module and an analog-to-digital converter, causing the cabinet system to function; and
      an interface for enabling an analog/digital signal to be transferred from the microphone to the computing device; and
   an augmented reality (AR) headset connected to the system for visualization of images of excised specimens acquired using the cabinet x-ray system and for providing feedback.

2. The system according to claim 1, wherein the computing device further comprises:
   at least one processor, and
   at least one module operable by the at least one processor to:
      output, for display, a verification of the speech command;
      receive audio data;
      determine, based on the audio data, a voice-initiated action; and
      responsive to determining the voice-initiated action, output for display a change of the GUI to indicate that the speech command has been determined and recognized.

3. The system according to claim 2, further comprising responsive to determining the voice-initiated action based on the audio data, performing, by the computing device, the voice-initiated action.

4. The system according to claim 2, wherein determining the voice-initiated action further comprises: generating by the computing device and based in part on the audio data, a transcription of the audio data and determining, by the computing device and based at least in part on a comparison of at least one word from the transcription, or a phrase from the transcription to a preconfigured set of actions, the voice-initiated action.

5. The system according to claim 4, wherein determining the voice-initiated action further comprises: identifying, by the computing device, at least one verb in the transcription; and comparing, by the computing device, to at least one verb to one or more verbs from a set of verbs, each verb in the set of verbs corresponding to at least one action from a plurality of actions including the voice-initiated action.

6. The system according to claim 2 wherein, determining the voice-initiated action further comprises: determining, by the computing device and based in part on data from the computing device, a context; determined, by the computing device and based at least in part on the context, the voice-initiated action.

7. The system according to claim 2, further comprising responsive to determining an AR initiated action based on video data, performing, by the computing device, a video-initiated action.

8. The system according to claim 2, wherein examined items may be organic and non-organic.

* * * * *